United States Patent
Engelkes et al.

(10) Patent No.: US 9,685,176 B2
(45) Date of Patent: Jun. 20, 2017

(54) PROCESS TO INHIBIT SLIDER CONTAMINATION DURING PROCESSING

(71) Applicant: Seagate Technology LLC, Cupertino, CA (US)

(72) Inventors: Vince B. Engelkes, Maple Grove, MN (US); Peter Gunderson, Ellsworth, WI (US); Timothy W. Stoebe, Minnetonka, MN (US); David J. Ellison, Minneapolis, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 290 days.

(21) Appl. No.: 13/943,184

(22) Filed: Jul. 16, 2013

(65) Prior Publication Data

US 2015/0020379 A1 Jan. 22, 2015

(51) Int. Cl.
*G11B 5/127* (2006.01)
*H04R 31/00* (2006.01)
*G11B 5/31* (2006.01)
*G11B 5/40* (2006.01)

(52) U.S. Cl.
CPC .......... *G11B 5/3173* (2013.01); *G11B 5/3169* (2013.01); *G11B 5/40* (2013.01); *Y10T 29/49021* (2015.01)

(58) Field of Classification Search
CPC .......... B24B 37/11; C23F 11/04; C23F 11/10; C23F 17/00; G11B 5/187; G11B 5/255; G11B 5/3169; G11B 5/40; Y10T 29/49032; Y10T 29/49041; Y10T 29/49046; Y10T 29/49048
USPC ...... 29/417, 603.12–603.16, 603.18; 216/62, 216/65, 66; 360/235.7, 235.8, 236.3, 360/236.5, 236.6, 237; 451/5, 41
See application file for complete search history.

(56) References Cited

U.S. PATENT DOCUMENTS

| | | | |
|---|---|---|---|
| 5,271,802 A | 12/1993 | Chang et al. | |
| 6,202,289 B1* | 3/2001 | Yoshimura | G11B 5/3106 29/603.12 |
| 6,899,456 B2* | 5/2005 | Sundaram et al. | 374/4 |
| 6,984,262 B2* | 1/2006 | King et al. | 106/287.22 |
| 7,607,215 B2* | 10/2009 | Murakoshi | 29/603.12 |
| 7,681,303 B2* | 3/2010 | Kondo et al. | 29/603.12 |
| 8,623,197 B1* | 1/2014 | Kobsiriphat et al. | 205/777.5 |
| 8,717,680 B2* | 5/2014 | Radivojevic | C09D 191/06 106/18.12 |
| 2007/0196673 A1 | 8/2007 | Hancer et al. | |
| 2009/0073610 A1* | 3/2009 | Ohtani | G11B 5/6005 360/234.3 |
| 2011/0205665 A1* | 8/2011 | Jones | G11B 5/725 360/110 |
| 2013/0000107 A1 | 1/2013 | Pust et al. | |

\* cited by examiner

*Primary Examiner* — Paul D Kim
(74) *Attorney, Agent, or Firm* — Holzer Patel Drennan

(57) ABSTRACT

Methods for forming a slider for a disc drive. One method includes forming a plurality of sliders on a wafer, applying a self-assembled monolayer coating on the plurality of sliders, and cutting the plurality of sliders into a plurality of individual sliders. Another method includes forming a plurality of sliders on a wafer, applying a low surface energy coating on the plurality of sliders, and cutting the plurality of sliders into a plurality of individual sliders.

20 Claims, 1 Drawing Sheet

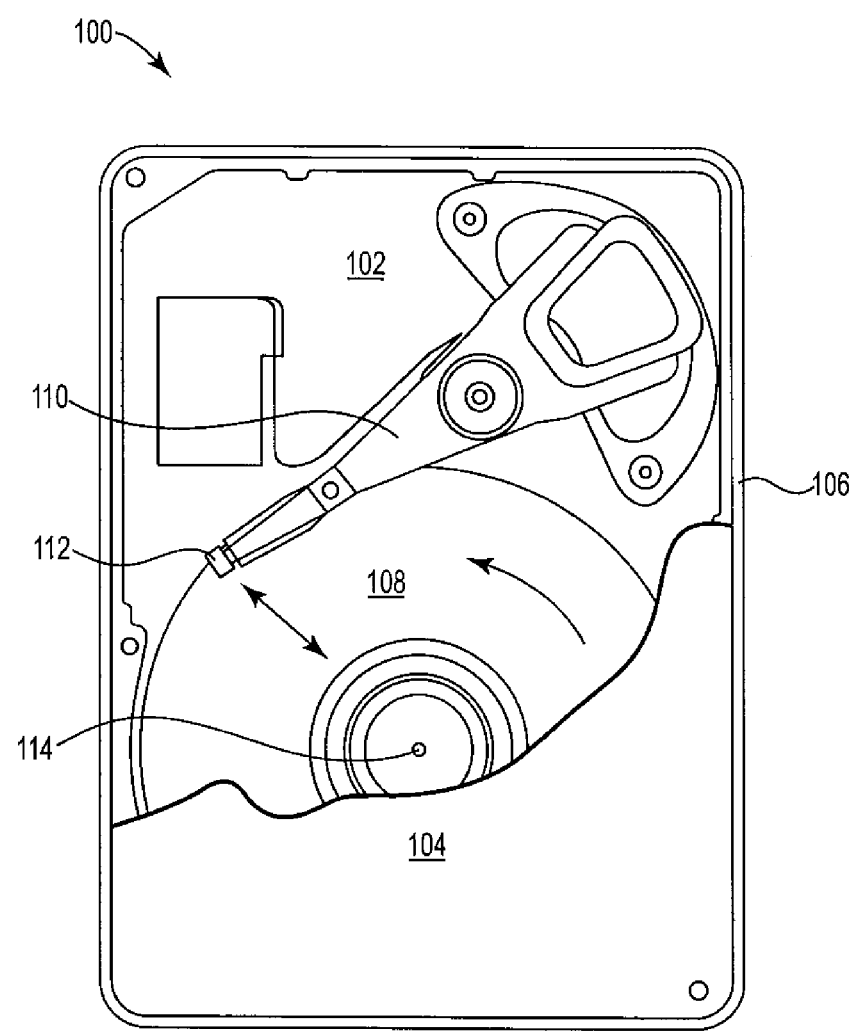

PROCESS TO INHIBIT SLIDER CONTAMINATION DURING PROCESSING

BACKGROUND

Hard disc drives are common information storage devices having of a series of rotatable discs that are accessed by magnetic reading and writing elements. These data elements, commonly known as transducers, are typically carried by and embedded in a slider that is held in a close relative position over discrete data tracks formed on a disc to permit a read or write operation to be carried out.

Multiple sliders are simultaneously formed on a ceramic or silicon wafer and then processed to produce individual sliders, which are then incorporated into disc drives.

SUMMARY

The present disclosure provides processes for producing sliders by utilizing a low energy surface coating in the process.

One particular embodiment of this disclosure is a method of forming a slider for a disc drive. The method includes forming a plurality of sliders on a wafer, applying a self-assembled monolayer coating on the plurality of sliders, and cutting the plurality of sliders into a plurality of individual sliders.

Another particular embodiment of this disclosure is a method of forming a slider for a disc drive by forming a plurality of sliders on a wafer, cutting the wafer into a plurality of slider row bars, and applying a low surface energy coating on the plurality of slider row bars.

Yet another particular embodiment of this disclosure is a method of forming a slider for a disc drive by forming a plurality of sliders on a wafer, applying a low surface energy coating on the wafer, and cutting the wafer with the low surface energy coating into a plurality of slider row bars.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which:

FIG. 1 is a schematic, top view of a hard disc drive.

DETAILED DESCRIPTION

The present embodiments relate most generally to processes for making magnetic sliders for disc drives. Prior to forming individual sliders, the wafer (e.g., ceramic or silicon wafer), the stack cut from the wafer, or the row bar cut from the stack or wafer is treated with a low surface energy coating, such as a self-assembled monolayer (SAM). Coating the wafer or bars with a low surface energy coating creates a low energy surface that passivates the surface and thus resists adherence of particulate and other contaminants to the surface, reducing the need for intensive cleaning steps. Additionally, the low surface energy coating improves the effectiveness of any cleaning steps.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above those other elements.

Referring to FIG. 1, an exemplary magnetic disc drive 100 is schematically illustrated. Disc drive 100 includes base 102 and top cover 104, shown partially cut away. Base 102 combines with top cover 104 to form a housing 106, in which is located one or more rotatable magnetic data storage media or discs 108. Magnetic storage media 108 are attached to spindle 114 for co-rotation about a central axis. It should be noted that a pack of multiple discs or media 108 is utilized in some embodiments, and only a single disc or medium 108 is used in other embodiments. Each disc or medium surface has an associated head or slider 112 which is mounted adjacent to and in communication with its corresponding disc or media 108. Head or slider 112 includes a data recording transducer and a data reading transducer (also referred to as read/write heads, and the like), which read and write data to storage disc or media 108. In the example shown in FIG. 1, head or slider 112 is supported by an actuator assembly 110, composed of various elements that are known in the field. The actuator assembly 110 shown in FIG. 1 is of the type known as a rotary moving coil actuator and includes a voice coil motor to rotate actuator assembly 110 with its attached slider 112 to position slider 112 and its read/write heads over a desired data track along an arcuate path between an inner diameter and an outer diameter of disc of media 108.

Slider 112 is built upstream in wafer form, in which a large number of magnetic read/write heads are formed using semiconductor processing techniques on the surface of a silicon or ceramic wafer. For example, up to 20,000 heads or sliders can be patterned on a 5-inch diameter wafer, and larger wafers can also be used. After the read/write heads are patterned on the wafer, the wafer is cut or sliced (usually in a series of steps) into rows or bars of sliders, which are commonly called "slider row bars" or merely "row bars"; each row bar may have 40 to 200 sliders, but it could have more or less. Sometimes, an intermediate step is performed where the wafer is cut or sliced into a "stack", which is composed of about 30 to 100 slider row bars, but could have more or less. The various cutting processes can be performed with a diamond-tipped saw or with a laser. Once the row bars have been cut from the wafer, the row bar is processed (e.g., "lapped") to provide the sliders with the desired size and shape. In some processes, the stack is lapped to provide the sliders with the desired size and shape, or with an intermediate size and shape.

Lapping processes utilize either oscillatory or rotary motion of the slider bar across a rotating lapping plate. Some lapping plates have an abrasiveless horizontal working surface and are used in conjunction with a slurry of abrasive particles (e.g., diamonds), whereas other lapping plates have abrasive particles (e.g., diamonds) embedded in the horizontal working surface. After lapping, the stack is further sliced or diced, i.e., separated into row bars or into individual sliders. Similarly, after lapping, the row bar is further diced, i.e., separated into individual sliders.

Each of the cutting processes, be it from the wafer form to the row bar form, or the row bar form to the individual slider form, creates contamination. Examples of such contamination include particulate contamination and also chemical contamination; in general, sawing typically produces particulate contamination and laser cutting typically produces chemical contamination, due to ablation or other degradation of the various materials.

Because it is very important that the surface of the slider in the disc drive is free of contaminants, it is desired to either reduce the occurrence of contaminants at their source or to inhibit their adhering to the surface of the slider. In accordance with this invention, a low surface energy coating is applied on the entire row bar of sliders prior to the step of dicing the row bar into individual sliders. In some embodiments, the low surface energy coating is applied prior to slicing the wafer into row bars to protect the trailing edge surface of a finished slider. In other embodiments, the low surface energy coating is applied prior to slicing the stack into row bars.

The term "low surface energy" and variations thereof, as used herein, refers to the tendency of a surface to resist wetting or adsorption by other unwanted materials or solutions. Values that are representative of "low surface energy" are in the range of 5-30 dyne/cm.

The low surface energy coating can be a self-assembled monolayer (SAM) coating. The terms "self-assembled monolayer" and "SAM" as used herein refer to a thin monolayer coating wherein surface-active molecules present in a liquid and/or vapor reaction solution are provided (e.g., adsorbed and/or chemisorbed) on the surface of the slider to produce chemical bonds therebetween.

The precursor compound for forming the self-assembled monolayer or SAM contains molecules having a head group and a functional end or tail group. Common head groups include thiols, silanes, phosphonates, etc. SAMs are created by chemisorption of the head groups onto the substrate material (i.e., in this application, onto the wafer or the slider row bar) from either a vapor or liquid phase, by processes such as immersion or dip coating, spraying, chemical vapor deposition (CVD), micro-contact printing, dip-pen nanolithography, etc. The head groups closely assemble on the material with the tail groups extending away from the material. The self-assembled monolayer can be, for example, a reactive organosilicon or organosilane compound (e.g. alkyl trichlorosilane, fluorinated alkyl trichlorosilane, alkyl trialkyloxysilane, fluorinated alkyl trialkyloxysilane, etc.) or a reactive mercapto compound.

The precursor compound of the SAM may be present in any conventionally-used organic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (TEXANOL)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM. An immersion step may be performed without particular limitation and may be carried out at room temperature for about 20 to 120 minutes. Similarly, other methods may be carried out by conventional means.

The precursor compound for forming the self-assembled monolayer is selected so that the resulting SAM has the desired properties. An example of a commercially available low surface energy SAM is 1H,1H,2H,2H-perfluorodecyltrichlorosilane (alternately, heptadecafluoro-1,1,2,2-tetrahydro-decyl-1-trichlorosilane). Other low surface energy SAM materials could be used, such as trifluoropropyltrimethoxysilane, heneicosafluorododecyltrichlorosilane, methyltrichlorosilane, ethyltrichlorosilane, propyltrimethoxysilane, hexyltrimethoxysilane, n-octyltriethoxysilane, n-decyltrichlorosilane, dodecyltrichlorosilane, octadecyltrichlorosilane, methyl 11-[dichloro(methyl)silyl] undecanoate, acetoxyethyltrichlorosilane, vinyltriethoxysilane, and nonafluorohexyltrimethoxysilane.

The deposition solution and resulting SAM layer may be selected to resist adherence of various particulates and/or of various chemical contaminants, such as oils, lubricants, metal oxides, etc. The coating may contain one or a mix of various precursor compounds selected to fine-tune the resultant surface energy and behavior based on the possible contaminants. The coating may additionally or alternately be selected to be compatible with the cleaning chemistry used to clean the wafer, slider row bar and/or individual sliders. Examples of common cleaners include ChemCrest™ from Crest Ultrasonics Co., Valtron® from Valtech Corp., and Micro-90® from International Products Corp. and solvents such as cyclohexane, isopropyl alcohol, acetone and ethanol.

In accordance with this invention, the low surface energy coating (e.g., SAM coating) is applied before the individual sliders are cut (diced) from the row bar. The low surface energy coating may be applied to the wafer prior to cutting (slicing) to obtain the slider row bars and/or may be applied to the slider row bar prior to cutting (dicing) to obtain the individual sliders. If the coating is applied to the slider row bar, it is generally done after the lapping steps, to avoid removal of the coating during the lapping process.

The coating may be applied to the wafer and/or the row bar by conventional methods known for applying such coatings, such as immersion or dip coating, spraying, chemical vapor deposition (CVD). The resulting coating typically has a thickness of about 5 to 20 Angstroms, although thinner or thicker coatings can be used, depending on the coating material and process. A SAM, being a self-terminating molecular monolayer, typically has a thickness no greater than 20 Angstroms. After application of the monolayer, the coated substrate (i.e., the wafer or the slider row bar) is cut by known methods (e.g., by saw or by laser).

Other low surface energy coatings may be utilized on the wafer and/or the row bar to inhibit contaminant adhesion. Other low or reduced surface energy coatings include molecularly thin films of diamond-like carbon (DLC) that may be doped with fluorine, other passivated ceramic layers, molecularly thin vapor deposited of lubricants, and molecularly thin spin-coated or dip coated thin polymer films, such as fluorinated films (e.g., polytetrafluoroethylene).

Thus, embodiments of the PROCESS TO INHIBIT SLIDER CONTAMINATION DURING PROCESSING are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of forming a slider for a disc drive, comprising:
    forming a plurality of sliders on a wafer;
    applying a low surface energy self-assembled monolayer coating on the plurality of sliders, thus forming a first single layer of molecules on the plurality of sliders;
    applying a second self-assembled monolayer coating on the plurality of sliders, thus forming a second single layer of molecules on the plurality of sliders, subsequent to applying the low surface energy self-assembled monolayer coating; and
    cutting the plurality of sliders into a plurality of individual sliders.

2. The method of claim 1 wherein applying the self-assembled monolayer coating is accomplished by applying the self-assembled monolayer coating on the wafer.

3. The method of claim 2 further comprising cutting the wafer into a plurality of slider row bars after applying the self-assembled monolayer coating.

4. The method of claim 3 further comprising lapping the slider row bars prior to cutting the plurality of sliders into the plurality of individual sliders.

5. The method of claim 4 further comprising applying the second self-assembled monolayer coating on the lapped slider row bar, prior to cutting the plurality of sliders into the plurality of individual sliders.

6. The method of claim 1 further comprising:
    cutting the wafer into a plurality of slider row bars each comprising a plurality of sliders;
    applying the self-assembled monolayer coating on the slider row bar; and
    applying the second self-assembled monolayer coating on the slider row bar.

7. The method of claim 6 further comprising lapping the slider row bars prior to applying the self-assembled monolayer coating on the slider row bar.

8. The method of claim 7 further comprising applying the second self-assembled monolayer coating on the lapped slider row bar, prior to cutting the plurality of sliders into the plurality of individual sliders.

9. The method of claim 6 further comprising lapping the slider row bars after applying the self-assembled monolayer coating on the slider row bar.

10. The method of claim 9 comprising applying the second self-assembled monolayer coating prior to lapping the slider row bar.

11. The method of claim 9 comprising applying the second self-assembled monolayer coating after lapping the slider row bar.

12. The method of claim 1 wherein the self-assembled monolayer coating comprises an organosilane compound.

13. The method of claim 12 wherein the self-assembled monolayer coating comprises a fluorinated silane compound.

14. A method of forming a slider for a disc drive, comprising:
    forming a plurality of sliders on a wafer;
    applying a low surface energy self-assembled monolayer coating on the plurality of sliders on the wafer, thus forming a single layer of molecules on the plurality of sliders on the wafer;
    applying a second self-assembled monolayer coating on the low surface energy self-assembled monolayer coating, thus forming a single layer of molecules on the low surface energy self-assembled monolayer coating; and;
    forming at least one slider row bar from the wafer having the self-assembled monolayer coating thereon, the slider row bar comprising a plurality of sliders; and
    dicing the slider row bar into a plurality of individual sliders.

15. The method of claim 14 wherein the self-assembled monolayer coating comprises an organosilane compound.

16. The method of claim 14 wherein the self-assembled monolayer coating comprises a fluorinated silane compound.

17. A method of forming a slider for a disc drive, comprising:
    forming a plurality of sliders on a wafer;
    applying a low surface energy self-assembled monolayer coating on the plurality of sliders on the wafer;
    forming at least one slider row bar from the wafer having the self-assembled monolayer coating thereon, the slider row bar comprising a plurality of sliders;
    applying a second self-assembled monolayer onto the slider row bar; and
    dicing the slider row bar into a plurality of individual sliders after applying the second self-assembled monolayer.

18. The method of claim 17 wherein the self-assembled monolayer coating comprises an organosilane compound.

19. The method of claim 17 wherein the self-assembled monolayer coating comprises a fluorinated silane compound.

20. The method of claim 17 further comprising lapping the slider row bars prior to applying a second self-assembled monolayer onto the slider row bar.

* * * * *